United States Patent Office 2,942,015
Patented June 21, 1960

2,942,015

PREPARATION OF ORGANOZINC SULFATE AND SULFONATE COMPOUNDS

Harris E. Petree, Baton Rouge, La., assignor to Ethyl Corporation, New York, N.Y., a corporation of Delaware No Drawing. Filed July 30, 1958, Ser. No. 751,825

5 Claims. (Cl. 260—429.9)

This invention is concerned with the process for making organozinc compounds particularly organozinc organosulfate and sulfonate compounds.

It has recently been discovered that organozinc organosulfate and sulfonate compounds can be prepared. These unique compounds are of considerable utility as alkylating agents in reaction with metal salts, especially lead salts, to produce different organometallic compounds; as materials to be used in the formation of catalysts for the polymerization of olefins; and as getters for the removal of oxygen from gas streams. The compounds have been prepared by the reaction of an organic ester of sulfuric acid or organic sulfonic acid with metallic zinc in the presence of a fully alkylated alkylzinc compound. The procedure suffers particular disadvantage in that the yields obtained are not as high as desirable. Accordingly, it is desirable to provide a more efficient process for the preparation of these unique compounds.

An object of this invention is to provide a novel and more efficient process for the preparation of organozinc organosulfate and sulfonate compounds. A particular object is to provide such compounds in higher yield and purity than heretofore available. Other objects will be apparent as the discussion proceeds.

The process of this invention comprises the reaction of an organozinc halide with an organic ester of sulfuric acid or organo sulfonic acid. The process is generally conducted at a temperature between about 50 to 200° C. although a preferred operation embodies conducting the reaction at 50 to 100° C. The alkyl hydrocarbon zinc halides especially the bromides and iodides and the alkyl esters of sulfuric acid and sulfonic acids are particularly preferred. In a preferred embodiment an alkylzinc bromide or iodide is reacted with an alkyl sulfate at between about 50 to 100° C. to result in an alkylzinc alkylsulfate. An especially preferred embodiment is that wherein the alkyl groups heretofore named are those having up to and including about 6 carbon atoms in the radical.

By the process of this invention the unique organozinc organosulfate and sulfonate compounds are produced in high yield and purity. Likewise, such high yields and purity are obtained at comparatively low temperatures of operation. A particular advantage of the process is that the by-product produced is an organic halide which can be readily recycled and employed for reaction with zinc metal to produce the starting material, organozinc halide. These and other advantages of the process of this invention will be evident as the discussion proceeds.

The organosulfate or sulfonate ester which is employed is an ester of sulfuric acid or an organic sulfonic acid in which the hydrogen atoms have been substituted by organo radicals. Such esters can be depicted by the following formulae:

and

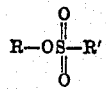

wherein R and R' can be the same or different and are aliphatic or aromatic organic radicals having up to about 30 carbon atoms. Typical examples of such esters include dimethyl sulfate, diethyl sulfate, dihexyl sulfate, dieicosyl sulfate, ethylmethyl sulfate, ethylhexyl sulfate, divinyl sulfate, diethynyl sulfate, diphenyl sulfate, dibenzyl sulfate, dinaphthyl sulfate, dicyclohexyl sulfate, ethyl ethanesulfonate, octyl ethanesulfonate, hexyl-p-toluenesulfonate, vinyl benzenesulfonate, phenyl benzenesulfonate, and the like. The hydrocarbon portion of such sulfates and sulfonates can of course be further substituted provided such substituents are essentially inert. However, in general, the hydrocarbon sulfates or sulfonates particularly hydrocarbon alkyl sulfates and sulfonates having up to and including about 6 carbon atoms in each alkyl group are preferred because of their greater availability, economy, and applicability to the process. The hydrocarbon alkyl sulfates are particularly preferred in that greater yields are obtained. Dimethyl and diethyl sulfate are especially preferred embodiments.

The other reactant employed in the process is an organozinc halide. In general any organozinc halide having the formula RZnX where X is a halogen and R is an organic radical as described previously can be employed. Among organozinc halides employable are included those wherein R is an aliphatic or aromatic radical preferably having up to about 30 carbon atoms, as for example, methylzinc iodine, ethylzinc bromide, pentylzinc chloride, hexylzinc iodide, decylzinc bromide, octadecylzinc chloride, eicosylzinc iodide, tricosylzinc iodide, vinylzinc chloride, cyclohexylzinc iodide, phenylzinc bromide and the like. The hydrocarbon zinc halides are particularly preferred but it is to be understood that the above named compounds are presented by way of illustration and the hydrocarbon groups can be further substituted with functional groups which are inert in the reaction. In this connection the alkylzinc halides, particularly the bromides and iodides, in which the alkyl groups have up to and including about 6 carbon atoms are especially preferred because of their greater availability, reactivity and application in the process. Methyl and ethylzinc iodide constitute especially preferred embodiments of this reactant.

The proportions of the reactants can be varied and are not necessarily critical. That is, an excess of either reactant can be employed. In general between about ½ to 1½ moles of the organic ester of sulfuric acid or organo sulfonic acid per mole of the organic zinc halide are employed. In a preferred embodiment, in order to result in more efficient utilization of the reactants, between and including about 1 to 1.25 moles of the organic ester of sulfuric or organo sulfonic acid are employed per mole of the organic zinc halide.

A general procedure for the reaction is to add the organozinc halide to a reactor and then add the organic ester with agitation. The contents of the reactor are heated to the desired temperature in the presence of a diluent, if desired. Generally a reactor is employed which will enable continuous removal of the by-product alkyl halide and, thus, atmospheric or sub-atmospheric pressure are preferably employed.

The process of this invention is further demonstrated by the following examples wherein all parts are by weight unless otherwise specified.

Example I

Into a reactor equipped with internal agitation, a reflux condenser and means for maintaining a nitrogen purge was added 48 parts of zinc powder. A nitrogen flush was then maintained in the system and 52.4 parts of ethyl iodide containing 1 part of diethylzinc was added to the reactor. The reactor was then heated and maintained from 80 to 87° C. for approximately 10 hours. Then the mixture was placed under vacuum of 0.3 to 0.5 millimeters of mercury for 3½ hours to remove all unreacted ethyl iodide and diethylzinc thereby leaving the ethylzinc iodide intermediate product and excess zinc in the reactor. Next 57 parts of diethyl sulfate was added to the reactor with agitation and the reactor maintained at 95° C. for 30 minutes during which time ethyl iodide was refluxed in the condenser. The temperature was then raised to 98 to 100° C. and maintained in this range for 2½ hours and the ethyl iodide, 28 parts, was recovered as formed and condensed. The reaction mixture was cooled to room temperature. The residue in the reactor was a solid gray mass comprising ethylzinc ethylsulfate and excess zinc metal which did not fume on contact with air but reacted vigorously with water to form a clear solution and unreacted zinc metal. The water solution was filtered and tested with barium chloride to test for the presence of sulfate ion. The test was negative. In order to recover the ethylzinc ethylsulfate from the zinc prior to the aforementioned tests, it is extracted with an ether, e.g. diethyl ether, in essentially quantitative yield.

Example II

To the reactor was added 44 parts of ethylzinc iodide in 150 parts of ligroin. Then the reactor was heated to 85° C. and 31 parts of diethyl sulfate were added thereto with agitation over a period of 15 minutes. The mixture was then cooked at this temperature for 2 hours while the by-product ethyl iodide was distilled from the reactor. The reaction mixture was then cooled to room temperature and filtered to separate the solid product. The solid product was freed from solvent by heating in an inert atmosphere. In this manner 42 parts of ethylzinc ethylsulfate were obtained representing a yield of 95 percent.

Example III

Example I is repeated with exception that ethylzinc chloride is substituted for ethylzinc iodide, the temperature employed is 75° C. and no diluent is used. Ethylzinc ethylsulfate is obtained in high yield.

Example IV

When 23 parts of n-hexylzinc bromide are reacted with 27 parts of dihexyl sulfate at 80° C. for 3 hours, n-hexylzinc hexylsulfate is obtained in high yield.

Example V

Example IV is repeated substituting vinylzinc iodide for n-hexylzinc bromide and divinyl sulfate for di-n-hexylsulfate employing the dimethyl ether of diethylene glycol, 100 parts, as a diluent. Vinylzinc vinylsulfate is obtained in high yield.

Example VI

Cyclohexylzinc bromide, 45 parts, is reacted with 53 parts of dicyclohexylsulfate in the presence of 200 parts of ligroin at 100° C. for 3 hours. Cyclohexylzinc cyclohexylsulfate is obtained in high yield.

Example VII

When phenylzinc chloride is reacted with diphenylsulfate in the presence of N,N-dimethylaniline at 100° C. for 2 hours, phenylzinc phenylsulfate is obtained.

Example VIII

Benzylzinc benzylsulfate is obtained in high yield when dibenzyl sulfate is reacted with benzylzinc chloride at 90° C. for 1 hour.

It is not necessary that the organo groups of the organozinc halide be identical with the organo groups of the organic ester of sulfuric or organo sulfonic acid. The following example will illustrate a reaction of this type.

Example IX

Example I is repeated with exception that methylzinc iodide is substituted for ethylzinc iodide. Methylzinc ethylsulfate is obtained in addition to ethyl iodide.

Likewise, the following example will demonstrate that the hydrocarbon groups of the organic ester of sulfuric or sulfonic acid need not be identical.

Example X

Example II is repeated with the exception that ethylmethyl sulfate is substituted for diethyl sulfate. A mixture of ethylzinc ethylsulfate and ethylzinc methylsulfate in essentially equal proportions is obtained.

Example XI

Example I is repeated essentially as described but ethyl p-toluenesulfonate is substituted for the diethylsulfate. Ethylzinc p-toluenesulfonate is produced in high yield.

Example XII

Ethylzinc ethanesulfonate is obtained when Example II is repeated employing ethyl ethanesulfonate in place of diethyl sulfate.

Example XIII

When n-hexylzinc bromide is reacted with phenyl benzene sulfonate at 75° C. for 3½ hours, n-hexylzinc benzenesulfonate is obtained.

Example XIV

Example VII is repeated employing phenyl benzenesulfonate in place of diphenyl sulfate. Phenylzinc benzenesulfonate is produced in high yield.

It is not intended that the invention be restricted to the above illustrative examples. For example, one may substitute dinaphthyl sulfate, diethynyl sulfate, cyclohexyl-p-toluenesulfonate, hexylhexenesulfonate, and the like for the sulfates and sulfonates employed therein and ethynylzinc chloride, octylzinc fluoride, octadecylzinc iodide, cyclopentylzinc bromide and the like for the organozinc halide employed.

The reaction is generally conducted at atmospheric pressure. However, if desired, subatmospheric and super atmospheric pressures as up to as high as 150 atmospheres and higher can be used. On the other hand, in some instances reflux conditions can also be employed which serves for better heat control, more intimate admixture, more efficient separation of lower boiling alkyl halide by-products, and enhancement in reaction rate. Generally, atmospheric and subatmospheric pressures are preferred.

Although solvents are not required such are generally employed when the sulfates, sulfonates, or organozinc halide compound is solid or insoluble in the reaction mixture. For such purposes the usual organic solvents can be employed with the general criteria being that they be essentially inert in the reaction and liquid under reaction conditions. Included among such solvents are the hydrocarbons, ethers and tertiary amines. Typical examples of such solvents include the aliphatic hydrocarbons, as for example, the hexanes, octanes, nonanes, octadecanes, cyclohexanes, and the like hydrocarbons. Among the tertiary amines which can be employed are included the tertiary alkyl, aryl and cyclic amines. Typical examples of such amines include methylpyridine, amyl-diphenylamine, p-isobutyldimethylaniline, triphenylamine, dimethyl aniline, tricyclohexylamine, triethylamine, trimethylamine and the like. Included among the ethers are the aliphatic and the polyethers. The aliphatic ethers include the monoaliphatic and mixed ethers. Typical examples of the monoaliphatic ethers included are di-n-butyl ether; di-sec-butyl ether; diisobutyl ether; di-n-amyl ether; di-n-heptyl ether; tetrahydrofuran; and the like saturated and unsaturated ethers. Examples of the mixed ethers which are employed are n-amylmethyl ether; tert-amylethyl ether; n-butylisopropyl ether; ethylisoamyl ether; n-butyl-n-propyl ether; and the like. Examples of the polyethers which are employed are those having the configuration R—O—$(CH_2)_n$—O—R wherein R is an organic radical, preferably aliphatic hydrocarbon or ether radicals, and $n$ is a small whole number as between about 1 to 10, preferably 1 to 3 inclusive. For example, such polyethers include ethylene glycol ethylmethyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. The aliphatic hydrocarbons and polyethers are particularly preferred solvents because of their economy, greater availability and ready removal from the reaction system. The amount of diluent employed can be varied over wide limits and in general is an amount sufficient to provide a fluid system. Thus, between about 1 to 100 parts of diluent per part by weight of the organozinc halide are generally employed. In a preferred operation between about 1 to 25 parts of diluent per part by weight of the organozinc halide are employed.

Having thus described the process of this invention it is not intended that the process be limited except as set forth in the following claims.

I claim:
1. The process which comprises reacting a hydrocarbon zinc halide with a compound selected from the group consisting of a dihydrocarbon ester of sulfuric acid and a hydrocarbon ester of a hydrocarbon sulfonic acid.
2. The process of claim 1 wherein the reaction is conducted at a temperature between about 50 to 100° C.
3. A process for the manufacture of ethylzinc ethylsulfate which comprises reacting ethylzinc iodide with diethyl-sulfate at a temperature between about 50 to 100° C.
4. A process for the manufacture of ethylzinc p-toluenesulfonate which comprises reacting ethylzinc iodide with ethyl p-toluenesulfonate at a temperature between about 50 to 100° C.
5. The process of claim 1 wherein the hydrocarbon groups of said hydrocarbon zinc halide, said dihydrocarbon ester of sulfuric acid, and said hydrocarbon ester of a sulfonic acid are alkyl groups having up to an including about 6 carbon atoms.

References Cited in the file of this patent

FOREIGN PATENTS

| | | |
|---|---|---|
| 584,196 | Great Britain | Jan. 9, 1947 |
| 603,616 | Great Britain | June 18, 1948 |